Feb. 28, 1933.   W. H. CRUME   1,899,137
METHOD OF MAKING FACED CONCRETE PRODUCTS
Filed Jan. 22, 1930   2 Sheets-Sheet 1
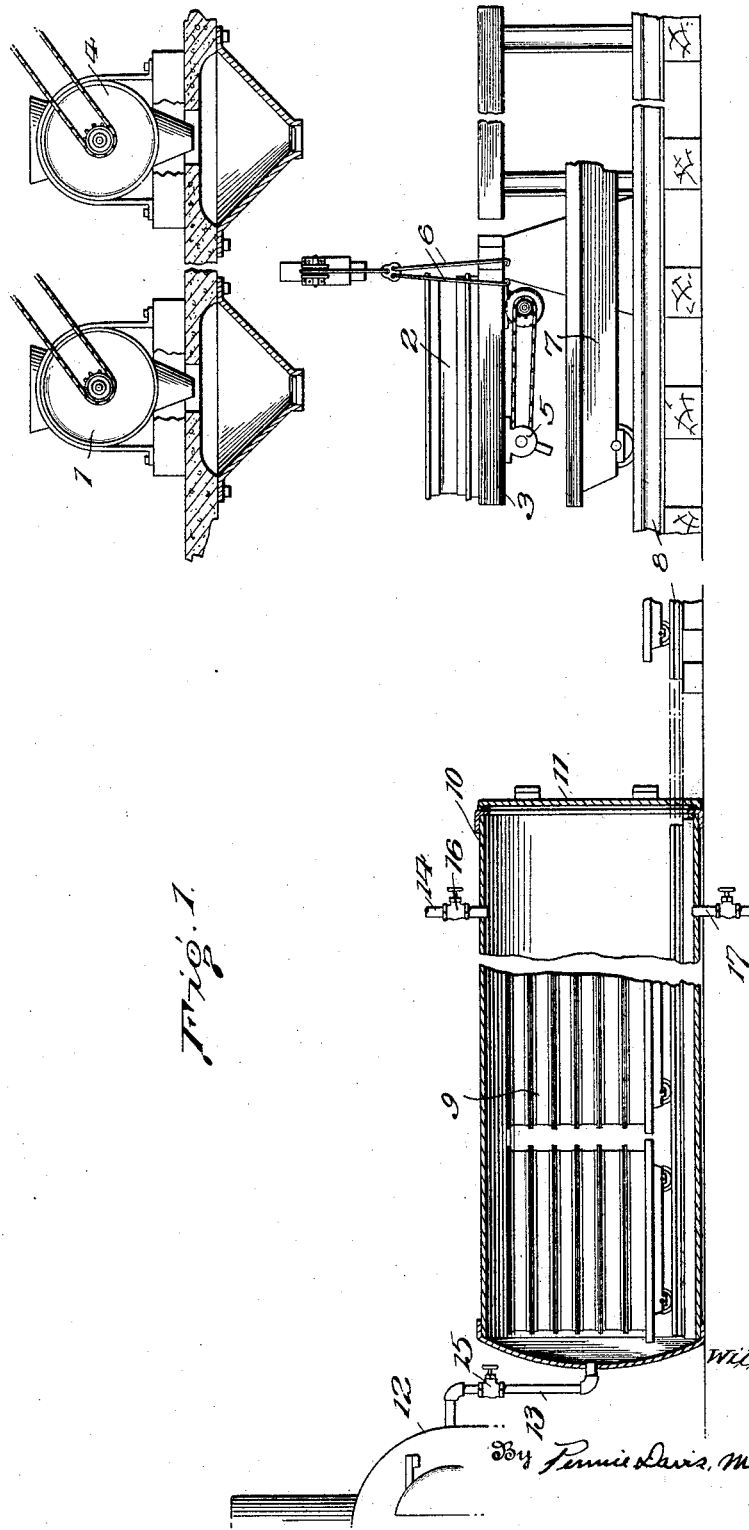
Inventor
William H. Crume
By Pennie Davis, Marvin and Edwards
Attorneys

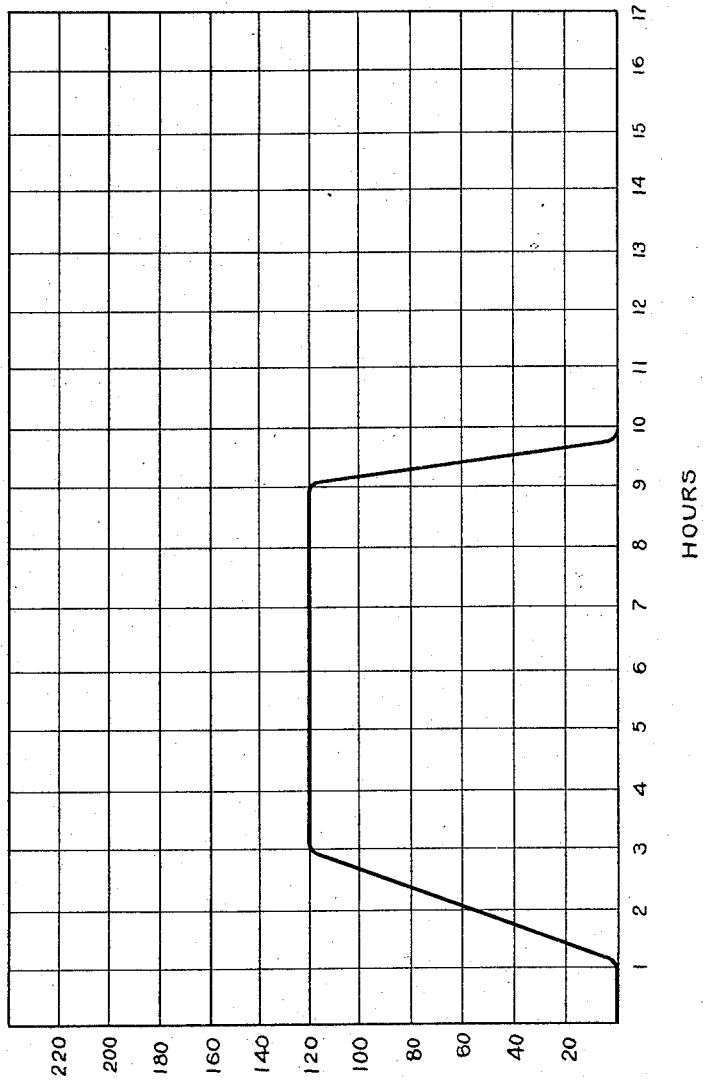

Patented Feb. 28, 1933

1,899,137

UNITED STATES PATENT OFFICE

WILLIAM H. CRUME, OF DAYTON, OHIO, ASSIGNOR TO THE MacGLASHAN CORPORATION, OF TECUMSEH, MICHIGAN, A CORPORATION OF DELAWARE

METHOD OF MAKING FACED CONCRETE PRODUCTS

Application filed January 22, 1930. Serial No. 422,635.

This invention relates to an improved concrete product and the process of producing the same.

Concrete products, and more particularly concrete building units such as face tile or blocks, concrete floor tile and cast stone, have been manufactured for a number of years to be used in substitution for natural rock and burned clay products. While concrete products have been found to be quite satisfactory when manufactured under very favorable and exact conditions, there have been, nevertheless, many objections to the use of the same. In some instances it was found that the process of manufacturing concrete products whereby sufficient strength would be had to permit a substitution for natural rocks, consumed so much time and the expense thereof was such that burned clay products and quite often natural rock would be obtained at a lower cost. Heretofore the use of concrete products as face units for either exterior or interior purposes has been limited, as the appearance and texture of the products manufactured by the usual methods, as well as the customary size, shape and weight, made them objectionable for such use.

Because of the fact that the normal appearance and texture of concrete building units makes them objectionable for many purposes, the use of such products has been greatly limited. Therefore, many attempts have been made to find a solution for the difficulties encountered, and one way in which the objection has been somewhat eliminated is by using the products only as a back-up in floor or wall constructions. However, such practice of using the products for back-up purposes necessitated facing the same with some material such as stucco, plaster, clay products, wall boards or slabs, or natural cut stone, and therefore other problems were presented. It has been found that the practice of facing the products is very costly, due to the use of the extra materials and because a prolonged period of time is required in the construction of buildings in this manner.

The practical limitations to the use of ordinary concrete products have been recognized for some years, not only in so far as the products themselves are concerned, but also in the facing of the products. In attempting to eliminate the necessity for facing the products, or to avoid a decided modification of the normal process of manufacture, there has been considerable activity tending to develop a simplified process of coloring the surfaces of the ordinary products, or of treating the surfaces to render them of an improved appearance of a lasting nature. However, so far as I am aware, no commercial process has previously been developed which will answer all of the requirements of the art.

Facings formed of aggregate such as sand, gravel or natural rock screenings, and Portland cement, in some instances combined with color, have been produced on concrete products, but the products seemed to present a flat more or less monotonous shade and texture.

It is an object of the present invention to overcome the numerous difficulties encountered in the manufacture of concrete products which have a surface presenting a pleasing appearance, and to produce such a product which is capable of being used immediately upon being discharged from the apparatus, without any tendency toward undue shrinkage of the product in use, and which is suitable for outside or interior walls of buildings.

The invention also contemplates the formation of concrete products having a face and a back-up portion, and which possesses unusually high strength as compared to products now intended to be used for similar purposes, said products being of uniform quality and presenting a greatly improved appearance.

Another object of this invention is the formation of concrete products which are light in weight and yet possess high strength, which provide an effective insulation against heat or cold, are fire and weather-resisting and still present a pleasing appearance.

A further object of this invention is the provision of a process by which concrete slabs may be made in substantially predetermined colors, in delicate tints, or with grained effects, and with a back-up of sand and gravel or crushed rock, or with aggregates of a light-weight character; and in which shrinkage of both the facing and back-up portions may be effected concurrently prior to the removal of the products from the mold, whereby the binding action encountered between the mold and the products is reduced and the products are more readily removed from the mold.

An additional object of the invention is the provision of a process by which concrete products are subjected to uniform steam treatment without effecting cracking or crazing of the products being formed during the carrying out of the process, in which the strength of the resultant products immediately after steam treatment is above or at least equal to the normally aged products now appearing on the market. Furthermore, the process effects a modification of the color of the basic material without destroying the coloring effect of the added coloring material.

Additionally, the invention contemplates a process in which concrete products having the qualities mentioned can be formed in a relatively short time to thereby permit the ready release of the equipment in which the process is carried out, so that the same equipment may be used for the formation of other products, and in which the products before removal from the equipment have attained approximately their maximum strength.

Other objects and advantages will be apparent from the following detailed description when considered in connection with the accompanying drawings, wherein I have illustrated a preferred system in which the invention may be carried out. However, it is to be understood that the more detailed description and illustration is an exemplification of the invention and the invention is not limited thereto. In the drawings, Figure 1 is a diagrammatic view of a system for carrying out the invention;

Fig. 2 is a graph showing the time curve with relation to steam pressure, and showing the pressure and time involved in the treatment of products formed with the different coloring materials specified in the two specific examples hereinafter set forth;

Now referring to the drawings in detail, the numeral 1 designates a mixing device wherein cement, sand and gravel or other aggregates, with or without color and water, are mixed. The coloring matter may vary in quantity to give tints, solid colors, blended, or other varied effects. Water should be added to this mixture so that it is preferably of a quaking consistency. A sufficient quantity of this mixture is then placed in a pallet or multiple vibrating mold, such as indicated at 2, to form a layer of a thickness desired upon the bottom thereof. This material in the mold is then vibrated, upon the vibrating support 3, a sufficient length of time to make a fairly uniform layer or coating of concrete in the bottom of each mold, and due to the vibration the coloring material forms uniformly or in a varied manner depending on the length of time, violence of the vibration, and the degree of mixing and consistency to which the mixture has previously been subjected.

Another mixing device 4 is arranged adjacent the mixing device 1, and the multiple mold 2 is so mounted that it may be moved under either mixing device to receive material discharged therefrom.

After the facing material has been deposited in the mold 2 and vibrated to form a uniform layer upon the bottom thereof, it is moved to a position beneath the mixing device 4. A mixture of cement, sand and gravel or other aggregate, with the addition of water, which has been produced in the mixing device 4, which mixture may be semi-dry, with sufficient water for thorough hydration during the process, or may contain sufficient water to be of a quaking consistency, is then discharged into the multiple vibrating mold 2 upon the layer or coating of facing material which was mixed in the mixing device 1. Care should be taken to make sure that the interim between the depositing of the facing material and the back-up material is not sufficient to permit the facing material to harden to any degree. The mold is again placed on the support 3 and vibrated a sufficient length of time to permit uniting of the face and the back-up portions by a relative penetration of one into the other. The amount of material discharged into the mold 2 from the mixing device 4 governs the thickness of the product produced, and it may be varied according to the manner in which the products are to be used in the building construction. Should it be desired to have the unit used in the building construction by extending from the interior to the exterior of the same, a further discharge of material from the mixing device 1 into the mold 2 upon the material already therein may be had, and a facing thereby formed below and above the back-up material delivered from the mixing device 4.

Both the mixing devices 1 and 4 and the multiple vibrating mold 2 are movable and interchangeable, so that should it at any time become desirable either mixing device or the mold may be replaced by another mixing device or mold.

Each mold 2 is adapted to be moved, either manually or by means of a crane, to a position upon the vibrating support 3, the support being adapted to be vibrated by means of vibrating mechanism 5 associated therewith, or, upon being filled, to a car for conveying it to a point for further treatment.

After the mold 2 has been filled, it is adapted to be engaged by hooks 6 associated with the crane for supporting and carrying the same to a point where it is deposited upon a car indicated at 7. The car 7 is adapted to be propelled along a track 8. A series of the molds with the material contained therein may be arranged upon the flat car 7 as indicated at 9, and the car moved along the track 8 into a steam chamber indicated at 10. The steam chamber or cylinder 10 is provided with an entrance door 11, or with a pair of doors arranged at the entrance and exit ends respectively, so that when the car with the pallets contained thereon is moved into the chamber, the pallets substantially fill the cross sectional area of the cylinder and the door or doors may be closed. The door 11, or both the doors, are so constructed that a steam pressure can be built up within the cylinder 10 without substantial escape of the steam therethrough.

A steam generator 12 is provided and an inlet pipe 13 is arranged between the generator and the cylinder 10 for conducting the steam thereto. An outlet or exhaust port 14 is provided in the wall of the cylinder for the purpose of permitting the escape of steam or air therethrough as desired.

After the door or doors are closed, steam is admitted through the inlet pipe 13 under the control of the valve 15 arranged therein, while the exhaust port under the control of the valve 16 in pipe 14 is permitted to remain open. The steam gradually heats the interior of the cylinder 10 and the material in the molds without building up any material pressure within the cylinder, and forces out the air contained therein which would tend to give the surface a gray or muddy appearance. After a temperature of about 212° F. is reached in the cylinder, the exhaust port 14 is closed by means of the valve 16 and the pressure is gradually built up within the cylinder. The valve 15 in the inlet pipe 13 is opened slightly farther at intervals, and the pressure within the cylinder is permitted to increase until substantially 100–150 lbs. per square inch is reached. This pressure of 100–150 lbs. per square inch is maintained for several hours, and upon the release of the steam pressure and the removal of the molds with the products contained therein from the cylinder, it is found that the units are equal to or superior in use to the materials heretofore used for similar purposes, that a sufficient shrinkage has occurred to permit the ready removal of the products from the molds without the creation of any cracks or weak points at the juncture between the face and back-up portions thereof, and that the strength is such that negligible breakage results from the handling of said units.

My experiments have demonstrated that in the curing of concrete products with steam and high pressure, the critical period develops in the early stages of admitting steam to the chamber, due to the excess moisture contained in the units in their green or naturally formed state. Only sufficient steam was admitted to expel the contained air in the chamber, and it was admitted gradually in sufficient quantity to raise the temperature of the chamber and the concrete units therein contained to the temperature of steam at atmospheric pressure, to thereby drive out of the concrete units the excess moisture they originally contained. If steam at pressure is introduced before the temperature of the units is raised to that of the steam at atmospheric pressure, the absorbing of the excess moisture from the units will take place only immediately adjacent the surface and the condition of hardening of the outer portion of the unit will arise. Such a condition causes the excess moisture in the interior of the unit, when escaping, to rupture the unit and effect cracks or laminations which tend to destroy the strength and effectiveness of the unit as a masonry building structure.

Specific examples which I have carried out are that, first, in the preparation of the facing material the mixtures ranging from semi-dry to a quaking consistency and of the proportions of one part Portland cement, four parts sand, and six parts crushed stone or gravel were prepared, in conjunction with a sufficient quantity of a ferric oxide coloring medium, and the mixtures with the coloring medium further mixed to the desired degree to produce a uniform color, or a variegated color as desired. The mixtures thus prepared were placed in the multiple molds and vibrated by means of an unbalanced weight vibrator for a period of time sufficient to make the same substantially homogeneous, and also sufficient to cause the surface in contact with the bottom of the mold to be of a solid or variegated color as desired. In these tests a concrete product of the normal weight and texture was intended to be produced, and therefore a second mixture consisting of the proportions of about one part cement, four parts sand and six parts crushed stone or gravel was produced, with the addition of water for thorough hydration during the process, and this mixture was placed into the multiple molds upon the facing material already therein. A further vibration of the molds was then caused by means of the unbalanced weight vibrator, and the vibration was continued for a period of time sufficient to make the back-up material homogeneous without effecting a penetration of the back-up material into the facing material to an extent beyond that necessary to form a firm bond.

The molds, with the material contained therein, were engaged by hook members associated with a crane and placed upon a car, which latter was moved along a track and into a steam cylinder. The doors of the cylinder were closed and an exhaust valve opened, after which steam was gradually introduced into the cylinder to drive out the air present therein and to raise the temperature of the cylinder very gradually until a temperature of 212° F. was reached. After reaching the temperature of 212° F. within the cylinder, the exhaust valve was closed and the steam valve only partially opened in the same manner as in driving out of the air and the heating of the interior of the cylinder. The steam valve was permitted to remain in this position for a period of approximately 30 minutes, and thereafter it was opened by degrees until a steam pressure of approximately 100 lbs. to 150 lbs. was reached. The steam pressure of 100 lbs. to 150 lbs. per square inch was maintained within the cylinder for substantially eight hours, whereupon the exhaust valve was opened and release of the steam pressure was effected.

When the molds were withdrawn from the cylinder and the molded products removed, it was found that the products were equal to normal products which have previously been made by other methods of curing, as air curing and curing in steam at atmospheric pressure and at a time after they had been permitted to age for a period of 28 days. The faces of the products were of a variegated character and of a pleasing appearance which resembled high grade natural rock.

Due to the above treatment at the time of removal from the steam cylinder the products were shrunk to an extent where they could be readily removed from the molds, and to an extent where material shrinkage was minimized when the products were placed in a building structure, and a firm bond was had between the facing and back-up portions so that units in use resembled natural stone.

Other specific examples which I have carried out involved the production of light-weight units, and the facing portions of the units were produced identically as set forth in the above examples. However, in the production of the back-up material to render the entire units of a light-weight character, a mixture of one part of Portland cement, five parts of glacial sand of the type found in the southwestern part of Ohio, and seven parts of crushed stone or gravel capable of pass through a 3/8 inch screen, with the stone or gravel preferably in the form of irregular fragments, was produced, with a thorough mixture with water to an extent of approximately 6% by weight of the remainder of the material, the mixing being carried on for a period of several minutes. The wetted mixture was then filled into the molds upon the facing material, and the molds were vibrated for a period of time sufficient to permit the settling and compacting of the material to some extent, but not sufficient to effect a formation of a layer of cement and sand separately from the aggregate upon the surface of the products, or at the face of contact of the back-up material with the facing material.

The remainder of this specific step was carried out in the treatment of the material in the molds in the same manner as in the previously described examples, and the products were found to be of unusually light weight, with facings substantially waterproofed on that portion which is exposed to the atmosphere when used in a building construction.

Various types of coloring matter which will withstand the bleaching action of high pressure steam may be used, as, for example, chemical, mineral, vegetable and metallic coloring agents. However, I have found the chemically pure metallic oxides to be best suited for most products. These may range from black into the various shades of browns, reds, greens, yellows and orange. The amount of coloring matter to be added depends upon the effect to be produced, the tinting power of the color, and the extent to which it is bleached in the steam treatment. Since the steam treatment turns the basic material of the standard concrete mixture naturally white in color, the coloring agent need only be added in sparing amount from 2% to 5% for the tints, and not more than about 10% for the solid colors, all weights being calculated on the weight of the cement used in the facing material. The coloring material will also preferably be in the form of a very fine powder, insoluble in water, alkaline, and acid and sun-proof.

When it is desired to produce concrete products having an appearance of a white background with a clouded or mottled effect, I find that the employment of metallic coloring material as ferric oxide is preferred since the steam treatment, although tending to bleach the normal color of the cement mixture, does not produce an appreciable bleaching effect upon the coloring, and with each of the specific examples outlined above, black oxide of iron to an extent of 2½% of the weight of the cement used in the facing material is added and mixed in such a manner to give the desired effect on the face.

If it is desired to produce a travertine or streaked effect of light brown with a background of light yellow, the facing material is mixed in the regular way with one part cement, about 3% of yellow being added and thoroughly mixed therewith. This will give the light yellow background. Brown color to the extent of about 3% is then mixed with one-quarter of the above mixture, and the resulting mixture is then spread on the bottom of the mold in streaks or spots, after which the remainder of the mixture, which forms the yellow background, is added to the desired thickness. The back-up material is then added and the unit completed as has already been set forth.

As will be obvious, the above examples may be varied in many ways with respect to color and the particular effect desired on the face of the unit. They are merely given as illustrative examples.

The graph illustrated in Fig. 2 shows the preferred manner of controlling the admission of the steam to the cylinder and the control of the steam pressure throughout the treatment of the products. It will be noted that the reading of the graph is the same as the specific examples of the test heretofore made and referred to above.

An outlet or drain 17 is employed for permitting a drainage of any water that may result from condensation within the cylinder during any stage of the treatment.

In so far as the general steam treatment of the units produced by the present method is concerned, it is substantially identical with the steam treatment of concrete products as described and claimed in my application Serial No. 354,362, and the equipment employed is the same except that the present equipment for carrying out the complete process embodies the means for producing the facing and back-up material so that one may be joined to the other.

The feature of producing the light weight backing is substantially the same as described and claimed in my application Serial No. 354,363, and the equipment for vibrating the mold to carry out this part of the process is operated substantially as described in said application. Furthermore, in the production of the light-weight back-up material I have employed cinder slag and other light weight aggregates of a manufactured character, and find that said material can be substituted in whole or in part with quite efficient results.

I claim:

1. The method of preparing faced concrete products which comprises preparing a mixture of facing material and effecting a deposit thereof in a mold, preparing a mixture of backing material and effecting a deposit thereof in the mold upon the facing material, subjecting the materials while in the mold to vibration and to the action of steam at substantially atmospheric pressure until the temperature thereof is substantially that of steam, and thereafter subjecting the materials to steam at a pressure in excess of that of the atmosphere.

2. The method of preparing faced concrete products which comprises preparing a mixture of facing material and effecting a deposit thereof in a mold, preparing a mixture of backing material and effecting a deposit thereof in the mold upon the facing material, subjecting the materials while in the mold to vibration and to the action of steam at substantially atmospheric pressure until the temperature thereof is approximately 212° F., and then increasing the pressure of the steam to which the product is subjected to between 100 lbs. and 150 lbs. pressure per square inch for approximately six to eight hours.

3. The method of preparing faced concrete products which comprises preparing a mixture of facing material with sufficient water to permit hydration, effecting the deposit of the material in a mold, vibrating the material in the mold to cause the same to present a smooth face upon the finished product, preparing a mixture of back-up material with sufficient water to permit hydration, effecting a deposit of the back-up material in the mold upon the facing material to an extent to cause the finished product to be of a predetermined thickness, again vibrating the mold with the facing and back-up materials therein to cause a firm bond between the same, and subjecting the materials in the mold to the action of steam at substantially atmospheric pressure until the temperature thereof is substantially that of steam and thereafter subjecting the materials to steam at a pressure in excess of that of the atmosphere.

4. The method of preparing light weight faced concrete products, which comprises preparing a mixture of facing material and effecting a deposit thereof in a mold, preparing a mixture of back-up material comprising one part cement, five parts sand, and seven parts gravel or crushed stone, and thoroughly mixing the ingredients with the addition of water from six to eight percent. by weight of said back-up mixture, depositing the back-up mixture in the mold upon the facing material and vibrating the mold sufficiently to form a bond between the mixtures and to settle and compact the mixture but insufficient to effect stratification of the sand and cement.

5. The method of preparing light weight faced concrete products which comprises preparing a mixture of facing material and effecting a deposit thereof in a mold, preparing a mixture of back-up material comprising one part cement, five parts sand, and seven parts gravel and crushed stone, and thoroughly mixing the ingredients with the addition of water from 6% to 8% by weight of said back-up mixture, depositing the back-up mixture in the mold upon the facing material and vibrating the mold for substantially fifty seconds at speed of about 3600 vibrations per minute to form a bond between the mixtures and to settle and compact the mixture without effecting stratification of the cement and sand.

6. The method of preparing light weight faced concrete products which comprises preparing a mixture of facing material and effecting a deposit thereof in a mold, preparing the mixture of back-up material as of cinders, previously crushed down to pass a three-eighth inch screen with dust and ash removed, comprising eight parts cinders passed through three-eighth inch screen upon a three-sixteenth inch screen; and eight parts of cinders passed through a three-sixteenth inch screen, one part cement, and from 5% to 20% calcined gypsum or plaster of Paris calculated on the weight of cement used in the back-up, the calcined gypsum or plaster of Paris being used to increase the setting action and hydration of cement and making the back-up material of dryer consistency, and thoroughly mixing the ingredients with the addition of water from 6% to 8% by weight of said back-up mixture, depositing the back-up mixture in the mold upon the facing material and vibrating the mold for substantially fifty seconds at a speed of about 3600 vibrations per minute to form a bond between the mixtures and to settle and compact the mixture without effecting stratification of the cement and cinders.

7. The method of preparing faced concrete products which comprises preparing a mixture of facing material with coloring matter incorporated therein and effecting a deposit thereof in a mold, preparing a mixture of backing material and effecting a deposit thereof in the mold upon the facing material, subjecting the materials while in the mold to vibration, and subjecting the facing material to a treatment tending to bleach the color of the material without unduly bleaching the coloring matter.

8. The method of preparing faced concrete products which comprises preparing a mixture of facing material with coloring matter incorporated therein, further preparing facing material differing in color and depositing the same in streaks or spots on the bottom of a mold, depositing the first-mentioned facing material within the mold so that a portion thereof is in contact with the bottom of the same, vibrating the mold with the material therein to produce a desired facing on the finished product, preparing a mixture of backing material and effecting a deposit thereof in the mold upon the facing material, subjecting the materials while in the mold to vibration and to the action of steam at substantially atmospheric pressure until the temperature thereof is substantially that of steam, and thereafter subjecting the materials to steam and a pressure in excess of that of the atmosphere.

9. The method of preparing faced concrete products which comprises preparing a mixture of facing material with coloring matter incorporated therein, further preparing facing material differing in color and depositing the same in streaks or spots on the bottom of a mold, depositing the first-mentioned facing material within the mold so that a portion thereof is in contact with the bottom of the same, vibrating the mold with the material therein to produce a desired facing on the finished product, preparing a mixture of backing material and effecting a deposit thereof in the mold upon the facing material, subjecting the materials while in the mold to vibration and to the action of steam at substantially atmospheric pressure until the temperature thereof is substantially that of steam, and thereafter subjecting the materials to steam at 100 lbs. to 150 lbs. pressure per square inch for approximately six to eight hours.

In testimony whereof I affix my signature.

WILLIAM H. CRUME.